(12) United States Patent
Tsang et al.

(10) Patent No.: US 10,103,413 B2
(45) Date of Patent: Oct. 16, 2018

(54) METHOD FOR REMOVING COPPER AND ALUMINUM FROM AN ELECTRODE MATERIAL, AND PROCESS FOR RECYCLING ELECTRODE MATERIAL FROM WASTE LITHIUM-ION BATTERIES

(71) Applicant: FARASIS ENERGY (GANZHOU) CO., LTD., Ganzhou (CN)

(72) Inventors: Floris Tsang, Walnut Creek, CA (US); Phillip Hailey, Oakland, CA (US)

(73) Assignee: Farasis Energy (Ganzhou) Co., Ltd., Ganzhou, Jiangxi Province (CN)

( * ) Notice: Subject to any disclaimer, the term of this patent is extended or adjusted under 35 U.S.C. 154(b) by 525 days.

(21) Appl. No.: 14/826,159

(22) Filed: Aug. 13, 2015

(65) Prior Publication Data

US 2016/0049700 A1 Feb. 18, 2016

Related U.S. Application Data

(60) Provisional application No. 62/036,932, filed on Aug. 13, 2014.

(51) Int. Cl.
| | | |
|---|---|---|
| *H01M 10/00* | (2006.01) | |
| *H01M 10/54* | (2006.01) | |
| *C22B 26/12* | (2006.01) | |
| *C22B 7/00* | (2006.01) | |
| *C22B 3/00* | (2006.01) | |
| *H01M 10/052* | (2010.01) | |

(52) U.S. Cl.
CPC .......... *H01M 10/54* (2013.01); *C22B 7/008* (2013.01); *C22B 23/0446* (2013.01); *C22B 26/12* (2013.01); *H01M 10/052* (2013.01); *Y02P 10/234* (2015.11); *Y02P 10/236* (2015.11); *Y02W 30/84* (2015.05)

(58) Field of Classification Search
CPC .... H01M 10/54; C22B 7/008; C22B 21/0023; C22B 15/0078; C22B 15/008; C22B 26/12; C22B 23/0446; Y02W 30/84; Y02P 10/234; Y02P 10/236
USPC .............. 429/49; 423/32, 33, 27, 131, 150.3
See application file for complete search history.

(56) References Cited

U.S. PATENT DOCUMENTS

| | | | | |
|---|---|---|---|---|
| 4,647,928 | A * | 3/1987 | Casey | B63B 39/00 114/122 |
| 5,345,033 | A * | 9/1994 | McLaughlin | A62D 3/00 405/128.85 |
| 5,882,811 | A * | 3/1999 | Kawakami | C22B 7/005 205/59 |
| 5,888,463 | A * | 3/1999 | McLaughlin | C01D 15/00 423/179.5 |
| 6,120,927 | A * | 9/2000 | Hayashi | H01M 10/54 423/179.5 |
| 6,261,712 | B1 * | 7/2001 | Hayashi | H01M 10/54 423/179.5 |
| 6,511,639 | B1 * | 1/2003 | Schmidt | H01M 6/52 423/179.5 |
| 6,514,311 | B1 | 2/2003 | Lin et al. | |
| 6,524,737 | B1 | 2/2003 | Tanii et al. | |
| 6,844,103 | B2 | 1/2005 | Lee et al. | |
| 2004/0028585 | A1 * | 2/2004 | Cardarelli | H01M 6/52 423/66 |
| 2017/0077564 | A1 * | 3/2017 | Wang | C22B 26/12 |

FOREIGN PATENT DOCUMENTS

| | | | |
|---|---|---|---|
| CN | 104164568 | * | 11/2014 |
| EP | 1056146 | * | 4/2004 |

* cited by examiner

*Primary Examiner* — Steven J Bos
(74) *Attorney, Agent, or Firm* — Womble Bond Dickinson (US) LLP

(57) ABSTRACT

The present invention provides a method for removing copper and aluminum from an electrode material and a process for recycling electrode material from waste lithium-ion batteries. The method for removing copper and aluminum from the electrode material comprises: subjecting the electrode material containing electrode active material, copper and aluminum to reaction with an aqueous solution, wherein the aqueous solution has a pH value of higher than 10, and comprises base, oxidizing agent and complexing agent. The process for recycling electrode material from waste lithium-ion batteries comprises: a) harvesting an electrode material containing electrode active material, copper and aluminum from waste lithium-ion batteries; b) removing copper and aluminum from the electrode material according to the foresaid method; and c) further purifying and regenerating the electrode active material for reuse in new lithium-ion batteries. The present invention thus provides a practical and efficient method for recycling active materials from waste lithium-ion batteries.

13 Claims, 5 Drawing Sheets

METHOD FOR REMOVING COPPER AND ALUMINUM FROM AN ELECTRODE MATERIAL, AND PROCESS FOR RECYCLING ELECTRODE MATERIAL FROM WASTE LITHIUM-ION BATTERIES

CROSS-REFERENCE TO RELATED APPLICATION

This application claims priority to U.S. provisional patent application No. 62/036,932, filed on Aug. 13, 2014, entitled "Method for Removing Copper and Aluminum from Recycled Battery Electrodes", which is specifically and entirely incorporated by reference.

FIELD OF THE INVENTION

The present invention relates to the field of lithium-ion batteries, and specifically to a method for removing copper and aluminum from an electrode material, and a process for recycling electrode material from waste lithium-ion batteries.

BACKGROUND OF THE INVENTION

Various methods exist for retrieving valuable components of "spent" lithium-ion secondary batteries in order to re-use the components in a recycled battery product. Specifically, the lithium-transition-metal oxides comprising the cathode active materials (e.g., $LiCoO_2$, $LiMn_2O_4$, $LiNiO_2$, $LiNiCoO_2$, $Li(LiNiCoMn)O_2$, and $LiNiCoMnO_2$) are of particular value in any lithium-ion battery recycling process. In order to retain their value in a recycled product, these materials must be recaptured at a high degree of purity, and free from contaminating metals such as aluminum, copper and iron, which if not removed would adversely affect the cycling performance and energy density of the recycled product. Iron is easily removed by exploiting its magnetic properties. The most effective way to isolate the valuable metal oxides from aluminum and copper is by dissolution of one or all of the desired or undesired components.

U.S. Pat. No. 6,514,311 uses hydrochloric acid to dissolve the transition-metal oxide into solution, followed by electrolysis to plate the pure metal out of solution. The metal must then be processed back into the lithium metal oxide in order to be usable again in a lithium-ion cell. U.S. Pat. No. 6,524,737 uses a dilute hydrochloric acid solution at elevated temperature to dissolve aluminum and copper while trying to minimize the deleterious effects on $LiCoO_2$, highlighting the practical trade-off between the efficacy of unwanted-material dissolution versus valuable-material preservation in an acidic environment. U.S. Pat. No. 6,844,103 provides a method for isolating $LiCoO_2$ from what they term a "cathode paste" comprising solely cathode materials, but provides no details on how such a pure starting material can be separated from the initial lithium-ion product. In practice, the initial isolation of purely a cathode material would be both impractical and inefficient, or less that 100% effective.

SUMMARY OF THE INVENTION

The present invention provides a method for removing copper and aluminum from an electrode material, and a process for recycling electrode material from waste lithium-ion batteries, in order to simultaneously achieve the complete dissolution of copper and aluminum from the recycled electrode material, while preserving the chemical and physical state of the electrode active material.

The method for removing copper and aluminum from an electrode material according to the present invention, comprises: subjecting the electrode material containing electrode active material, and copper and/or aluminum, to a reaction with an aqueous solution, wherein the aqueous solution has a pH value of higher than 10, and comprises base, oxidizing agent and complexing agent.

Preferably, the base in the aqueous solution is one or more selected from a group consisting of inorganic bases with a $pKb<1$. Particularly, the base may be one or more selected from a group consisting of lithium hydroxide (LiOH), sodium hydroxide (NaOH), potassium hydroxide (KOH) and calcium hydroxide ($Ca(OH)_2$).

Preferably, the pH value of the aqueous solution is higher than 11.

Preferably, the oxidizing agent is dissolved oxygen. In one particular embodiment, the dissolved oxygen is provided by aerating oxygen gas into the aqueous solution.

Preferably, the complexing agent is ammonium hydroxide ($NH_4OH$).

Preferably, in the aqueous solution, the concentration of the complexing agent is between 1 mol/L to 10 mol/L.

Preferably, the reaction temperature is between 20° C. to 90° C., and the reaction time is between 0.5 hour to 100 hours.

Preferably, the electrode active material is one or more selected from a group consisting of $LiCoO_2$, $LiMn_2O_4$, $LiNiO_2$, $LiNiCoO_2$, $Li(LiNiCoMn)O_2$, $LiNiCoMnO_2$, and $LiFePO_4$.

Preferably, the electrode material is powder or slurry.

The process for recycling electrode material from waste lithium-ion batteries according to the present invention, comprises:
a) harvesting an electrode material containing electrode active material, and copper and/or aluminum from waste lithium-ion batteries;
b) removing copper and aluminum from the electrode material according to the above method, and
c) reusing the electrode active material obtained in step b) in new lithium-ion batteries.

In the method for removing copper and aluminum from an electrode material according to the present invention, the used aqueous solution is corrosive to both aluminum and copper while being non-corrosive to the transition-metal oxides typically used as electrode active materials in lithium-ion batteries, such that copper and aluminum in the recycled electrode material may be completely dissolved, while preserving the chemical and physical state of the electrode active material. Therefore, the method of the present invention would be a practical and efficient means of purifying and recycling electrode active material from waste lithium-ion batteries.

DETAILED DESCRIPTION

Figure 1:
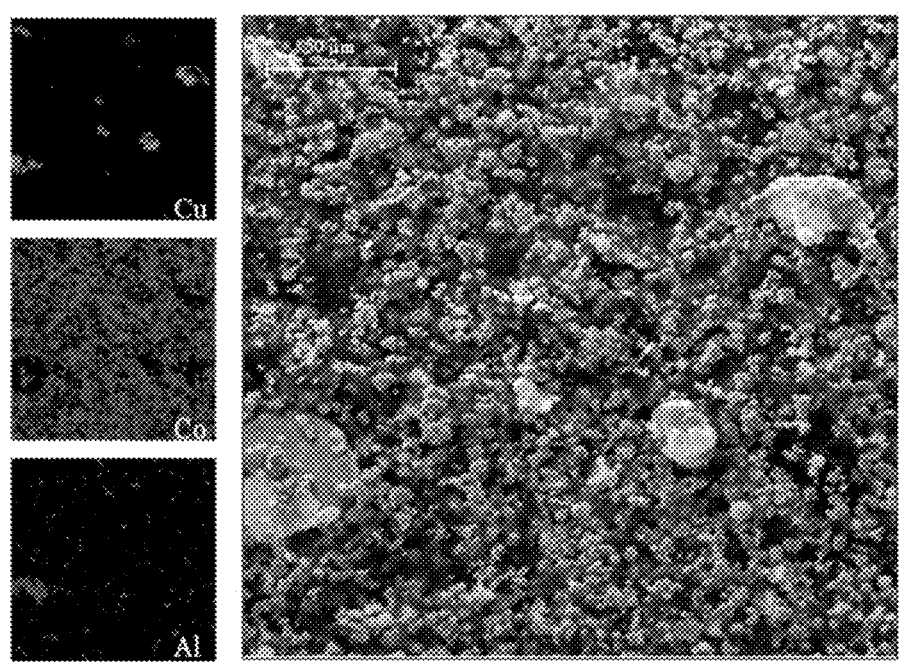
FIG. 1 is a SEM image with X-ray elemental mapping of a $LiCoO_2$ cathode laminate, containing particles of aluminum and copper, before treatment.

In the method for removing copper and aluminum from an electrode material of the present invention, an aqueous solution is used to react with copper and aluminum contained in the electrode material, such that said copper and aluminum are dissolved in the aqueous solution. The aqueous solution comprises base, oxidizing agent and complexing agent. The base is used to dissolve aluminum. The oxidizing agent is used to dissolve copper. And the complexing agent is used to prevent copper hydroxide precipitation. In addition, the pH value of the aqueous solution should be maintained at a relatively high level, and the high enough value (such as higher than 10, and preferably higher than 11) can prevent aluminum hydroxide precipitation.

In the present invention, the electrode material may be harvested from anode or cathode in waste lithium-ion secondary batteries. The electrode material may be used in its conventional harvested form, such as a powder or slurry. The electrode material may be pulverized to a fine particle size (for example, by a hammer mill), and then can be introduced to the solution bath in either a batch or continuous process. The solution is stirred and allowed to react until all of the copper and aluminum is dissolved.

In the present invention, the electrode active material contained in the electrode material may be any kind of conventional electrode active material which includes but is not limited to LiCoO$_2$, LiMn$_2$O$_4$, LiNiO$_2$, LiNiCoO$_2$, Li(LiNiCoMn)O$_2$, LiNiCoMnO$_2$, and LiFePO$_4$.

In the present invention, the aqueous solution may be made basic using an inorganic base with a pKb<1, such as lithium hydroxide (EOM, sodium hydroxide (NaOH), potassium hydroxide (KOH), or calcium hydroxide (Ca(OH)$_2$).

In the present invention, the oxidizing agent may be dissolved oxygen. In one embodiment, the aqueous solution is aerated with oxygen gas (O$_2$) in order to maintain a strongly oxidizing environment, while purging the solution of other undesired dissolved gasses, such as carbon dioxide. Preferably, the dissolved oxygen concentration is maintained near or above ambient levels.

In the present invention, the complexing agent may be any kind of conventional complexing agent that can form a complex compound with Cu$^{2+}$. In the most preferred embodiment, the complexing agent is ammonium hydroxide (NH$_4$OH), and the concentration of NH$_4$OH in the aqueous solution is maintained between 1 mol/L and 10 mol/L.

In the present invention, the reaction of the electrode material with the aqueous solution is carried out under a condition that the reaction temperature is 20° C. to 90° C., and the reaction time is between 0.5 hour to 100 hours, and preferably 5 hours to 20 hours.

In the present invention, the dissolved aluminum and copper can be re-precipitated either chemically or electrochemically in order to be collected and recycled.

In one preferred embodiment, the method for removing copper and aluminum from an electrode material comprises the following steps:
(1) formulating an aqueous solution comprising base, oxidizing agent and complexing agent that is corrosive to both aluminum and copper, the usage of the base is to maintain the pH value of the aqueous solution at higher than 10, the amount of the oxidizing agent is maintained by aerating with oxygen gas (O$_2$);

(2) introducing electrode material harvested from waste lithium-ion secondary batteries into the aqueous solution obtained in step (1) for a sufficient time as to dissolve any aluminum and copper initially present in the electrode material; and
(3) filtering, rinsing, and collecting the purified electrode active materials.

In the above preferred embodiment, when the complexing agent is NH$_4$OH, the reaction mechanisms are as follows:

Aluminum dissolution begins as a localized corrosion process:

(anodic reaction)

(cathodic reaction)

Followed by:

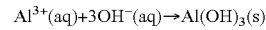

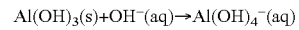

Where the rate of dissolution of Al(OH)$_3$ is dependant on the basicity (pH) of the solution, or amount of OH$^-$ present in the solution.

Localized corrosion of copper proceeds according to:

(anodic reaction)

(cathodic reaction)

Where the rate of copper dissolution is dependent on the amount of dissolved oxygen in the solution,
Followed by:

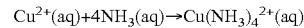

Hereinafter, the present invention will be described by way of examples. However, it will be recognized by those skilled in the art that these examples are provided for the purpose of illustration rather than limitation to the range of the present invention.

EXAMPLES

Example 1

Figure 2:
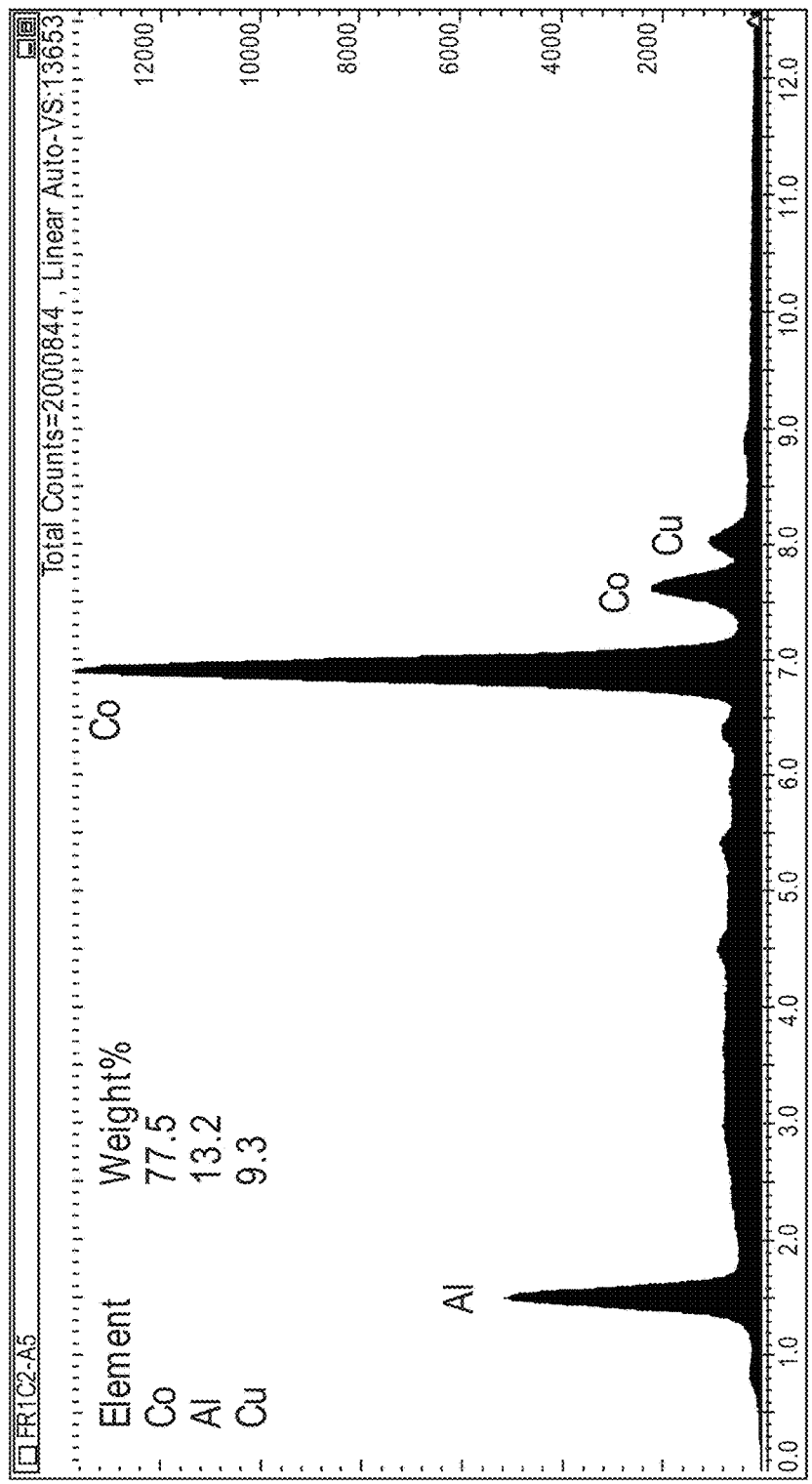
FIG. 2 is an X-ray EDS elemental spectrum of the $LiCoO_2$ cathode laminate of FIG. 1.

A slurry consisting of 90 wt. % ground LiCoO$_2$ cathode laminate, 5 wt. % aluminum powder, and 5 wt. % copper powder was mixed with polyvinylidene fluoride (PVDF) binder, and coated and dried as a thin film onto a stainless steel substrate. FIG. 1 shows an electron micrograph of a selected area of the electrode film before treatment, and X-ray elemental mapping showing the distribution of cobalt, aluminum and copper particles for the electrode film before treatment. FIG. 2 shows a spectrum of the X-ray elemental composition for the area shown in FIG. 1.

Figure 3:
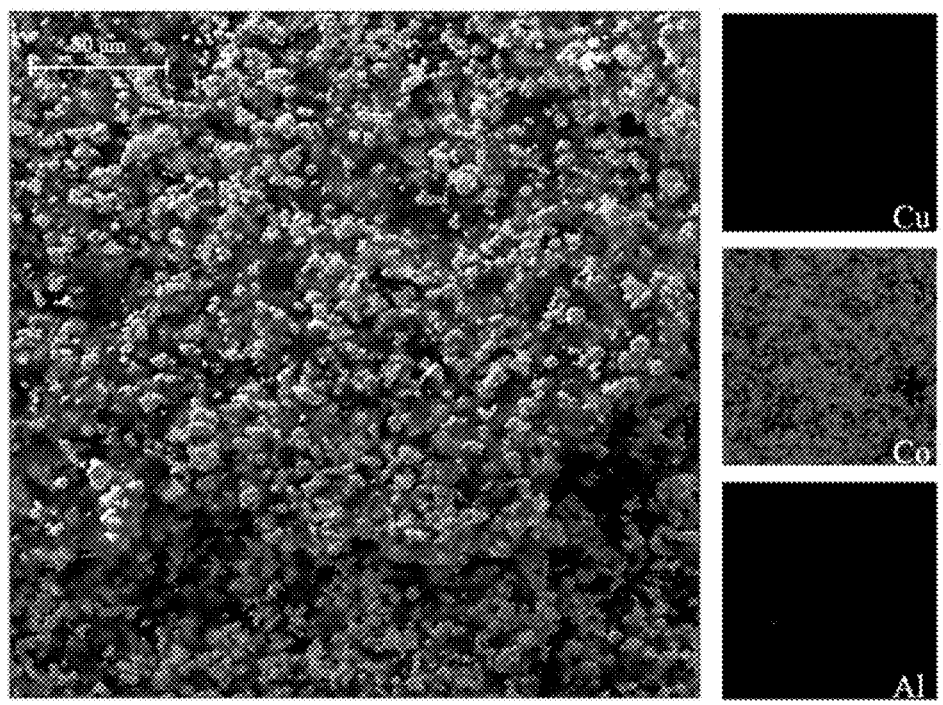
FIG. 3 is a SEM image with X-ray elemental mapping of the $LiCoO_2$ cathode laminate of FIG. 1, after treatment.
Figure 4:
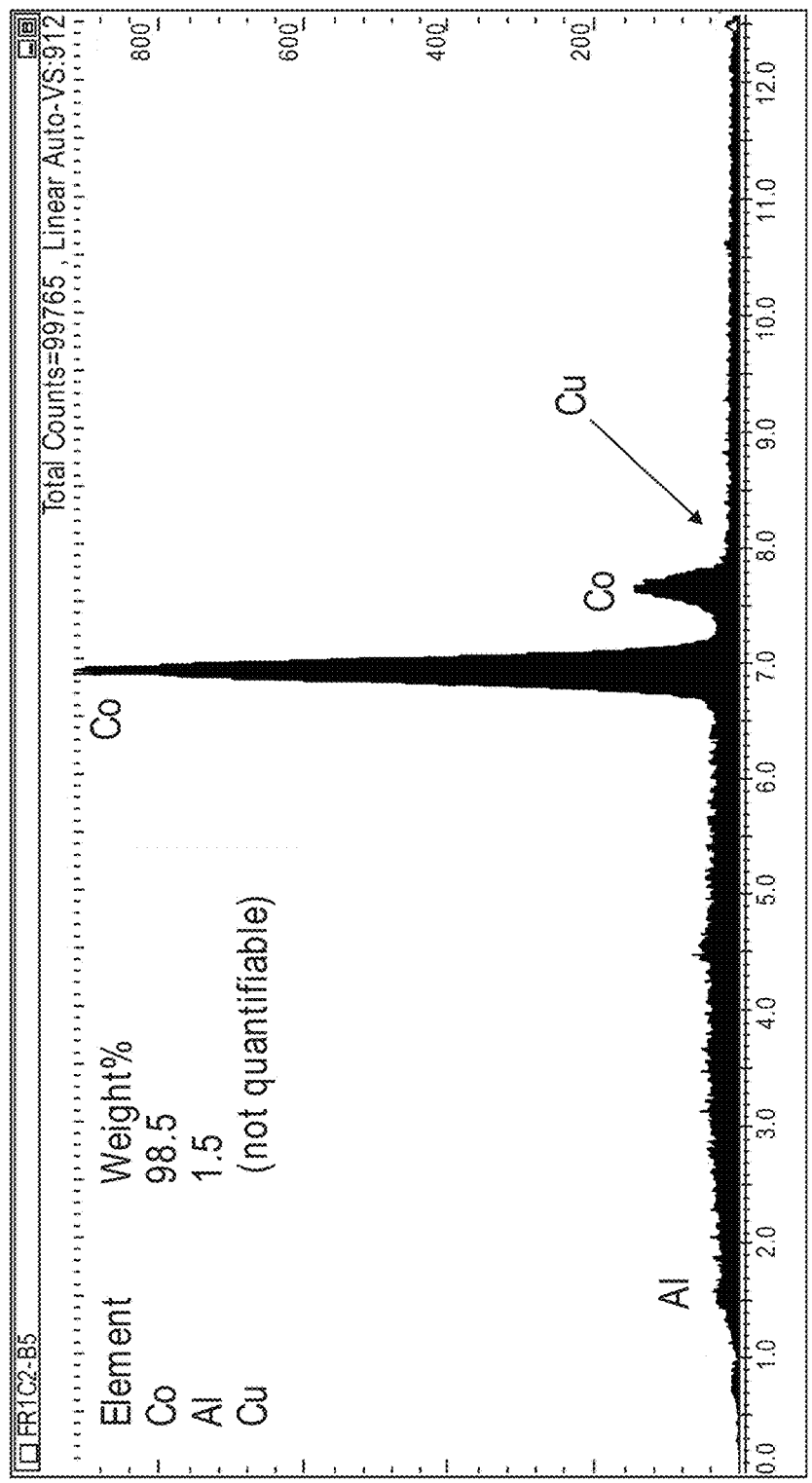
FIG. 4 is an X-ray EDS elemental spectrum of the $LiCoO_2$ cathode laminate of FIG. 3.

After the area had been mapped, the sample was placed in an aqueous solution comprising 5 mol/L NH$_4$OH and 1 mol/L LiOH in deionized water, with the dissolved oxygen content maintained by aerating with oxygen gas, and having a pH value above 13. The sample was stirred and allowed to soak in the aqueous solution at room temperature for a period of 12 hours, and then was rinsed with deionized water and dried. The sample was again analyzed in the electron microscope, and the same region was mapped for cobalt, aluminum, and copper. As can be seen in FIGS. 3 and 4, the cobalt particles remained virtually intact within the coated film, while the aluminum and copper particles observed before treatment were completely dissolved away. Further-more, the solution had adopted a pale blue color, indicating the presence of $Cu(NH_3)_4^{2+}$ complex ion.

Example 2

Figure 5:
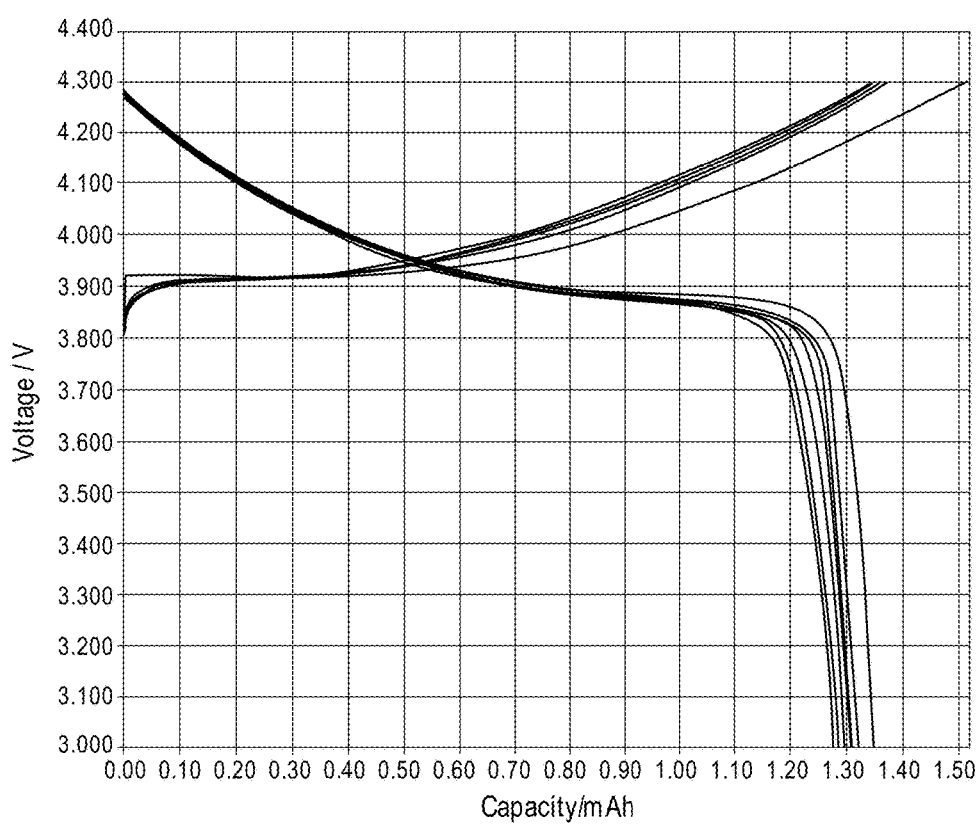
FIG. 5 shows voltage curves for the first 10 cycles of a LiCoO$_2$ cathode after treatment.

To a beaker containing 10 g of aqueous 5 mol/L $NH_4OH$ and 1 mol/L LiOH in deionized water was added 0.2 g of a powder consisting of 90 wt. % ground $LiCoO_2$ cathode laminate, 5 wt. % aluminum and 5 wt. % copper. The mixture was stirred at room temperature for 12 hours, then the solids were filtered and rinsed with deionized water and dried in a vacuum oven at 90° C. to remove any residual water. The obtained powder was mixed with acetylene black and PVDF to form a slurry, then coated onto aluminum foil to form a new cathode laminate. A coin cell was made comprising the cathode laminate, electrolyte, separator, and a lithium metal anode, and the coin cell was charged to 4.3V then discharged to 3.0V at a current of 0.15 mA. FIG. 5 shows the voltage curves for the first 10 cycles. And the result shows that the cycling performance of the recycled $LiCoO_2$ is consistent with untreated $LiCoO_2$. As can be seen from this example, the performance of the recycled electrode active material can be preserved according to the method of the present invention.

What is claimed is:

1. A method for removing copper and aluminum from an electrode material, comprising: subjecting the electrode material containing electrode active material, copper, and aluminum, to reaction with an aqueous solution, wherein the aqueous solution has a pH value higher than 10, and comprises base, oxidizing agent and complexing agent.

2. The method of claim 1, in which the base in the aqueous solution is one or more selected from the group consisting of inorganic bases with a pKb less than <1.

3. The method of claim 2, in which the base in the aqueous solution is one or more selected from the group consisting of lithium hydroxide (LiOH), sodium hydroxide (NaOH), and potassium hydroxide (KOH).

4. The method of claim 1, in which the pH value of the aqueous solution is higher than 11.

5. The method of claim 1, in which the oxidizing agent is dissolved oxygen.

6. The method of claim 5, in which the dissolved oxygen is provided by aerating oxygen gas into the aqueous solution.

7. The method of claim 1, in which the complexing agent is ammonium hydroxide ($NH_4OH$).

8. The method of claim 1, in which the concentration of the complexing agent is between 1 mol/L to 10 mol/L.

9. The method of claim 1, in which the reaction temperature is between 20° C. to 90° C., and the reaction time is between 0.5 hour and 100 hours.

10. The method of claim 1, in which the electrode active material is one or more selected from the group consisting of $LiCoO_2$, $LiMn_2O_4$, $LiNiO_2$, $LiNiCoO_2$, $Li(LiNiCoMn)O_2$, $LiNiCoMnO_2$, and $LiFePO_4$.

11. The method of claim 1, in which the electrode material is powder or slurry.

12. The method of claim 1, in which the electrode material is derived from waste lithium-ion batteries.

13. A process for recycling electrode material from waste lithium-ion batteries, comprising:
   a) harvesting an electrode material containing electrode active material, and which may contain copper and aluminum, from waste lithium-ion batteries;
   b) removing copper and aluminum from the electrode material according to the method of claim 1; and
   c) further purifying and regenerating the electrode active material obtained in operation b) for reuse in new lithium-ion batteries.

* * * * *